(12) United States Patent
Aerts et al.

(10) Patent No.: US 11,167,502 B2
(45) Date of Patent: Nov. 9, 2021

(54) COMPOSITES WITH INTERLAMINAR TOUGHENING PARTICLES AND METHOD OF MAKING THE SAME

(71) Applicant: Cytec Industries Inc., Princeton, NJ (US)

(72) Inventors: Vincent Aerts, Wrexham (IT); William Jacobs, Bethel, CT (US); James Martin Griffin, Orange, CA (US)

(73) Assignee: Cytec Industries Inc., Princeton, NJ (US)

( * ) Notice: Subject to any disclaimer, the term of this patent is extended or adjusted under 35 U.S.C. 154(b) by 319 days.

(21) Appl. No.: 16/183,970

(22) Filed: Nov. 8, 2018

(65) Prior Publication Data

US 2019/0134926 A1     May 9, 2019

Related U.S. Application Data

(60) Provisional application No. 62/583,212, filed on Nov. 8, 2017.

(51) Int. Cl.
  *B29C 70/02*     (2006.01)
  *C08L 63/00*     (2006.01)
  (Continued)

(52) U.S. Cl.
  CPC ............ *B29C 70/025* (2013.01); *B29C 70/42* (2013.01); *B32B 5/26* (2013.01); *B32B 5/30* (2013.01);
  (Continued)

(58) Field of Classification Search
  CPC ...... C08L 63/00; C09L 2312/00; B29C 70/30;
  B29K 2063/00; B29K 2105/0881; B29K 2307/04; B29K 2463/00; C08J 2363/00; C08J 5/024; C08J 5/24; B32B 2260/023; B32B 2262/02; B32B 2262/0253;
  (Continued)

(56) References Cited

U.S. PATENT DOCUMENTS

2015/0337183 A1* 11/2015 Pratte ................. C09J 171/00
                                                    156/60

FOREIGN PATENT DOCUMENTS

EP     0274899 A2    7/1988
EP     0820858 A1    1/1998
(Continued)

*Primary Examiner* — Camie S Thompson
(74) *Attorney, Agent, or Firm* — Thi Dang

(57) ABSTRACT

A fiber-reinforced polymeric composite structure having chemically active thermoset particles positioned in an interlaminar region between adjacent layers of reinforcement fibers and method of making the same. Upon curing of the composite structure, the chemically active functional groups on the thermoset particles form covalent bonds with the matrix resin surrounding the particles. In one embodiment, the particles are formed of a partially cured thermoset polymer with a degree of cure of less than 100%. In another embodiment, the particles are derived from a thermosettable resin composition, wherein the stoichiometry is such that there is a deficiency or an excess in the amount of curing agent that is necessary for reacting with 100% of the thermoset resin component. In some embodiments, the composition of the chemically active thermoset particles is the same or substantially the same as that of the matrix resin of the composite structure.

18 Claims, 1 Drawing Sheet

(51) Int. Cl.
B32B 27/38 (2006.01)
B32B 5/26 (2006.01)
B32B 5/30 (2006.01)
C08J 5/00 (2006.01)
C08J 5/24 (2006.01)
C08G 59/38 (2006.01)
C08G 59/50 (2006.01)
C08J 5/04 (2006.01)
C08G 59/32 (2006.01)
B29C 70/42 (2006.01)
B29K 105/08 (2006.01)
B29K 463/00 (2006.01)
B29K 307/04 (2006.01)
B29C 70/30 (2006.01)
B29K 63/00 (2006.01)

(52) U.S. Cl.
CPC .......... *B32B 27/38* (2013.01); *C08G 59/3227* (2013.01); *C08G 59/38* (2013.01); *C08G 59/504* (2013.01); *C08G 59/5033* (2013.01); *C08J 5/005* (2013.01); *C08J 5/04* (2013.01); *C08J 5/042* (2013.01); *C08J 5/24* (2013.01); *C08L 63/00* (2013.01); *B29C 70/30* (2013.01); *B29K 2063/00* (2013.01); *B29K 2105/0881* (2013.01); *B29K 2307/04* (2013.01); *B29K 2463/00* (2013.01); *B32B 2260/023* (2013.01); *B32B 2260/046* (2013.01); *B32B 2262/106* (2013.01); *B32B 2264/10* (2013.01); *C08G 2650/56* (2013.01); *C08J 2363/00* (2013.01); *C08J 2481/06* (2013.01); *C08L 2201/02* (2013.01); *C08L 2312/00* (2013.01)

(58) Field of Classification Search
CPC .... B32B 2262/0261; B32B 2262/0269; B32B 2262/0276; B32B 2262/10; B32B 2262/101; B32B 2262/105; B32B 2262/106; B32B 2262/14; B32B 5/08; B32B 5/10; B32B 5/12; B32B 5/26; B32B 5/30
USPC ......... 428/297.4, 327, 902; 442/248; 523/40
See application file for complete search history.

(56) References Cited

FOREIGN PATENT DOCUMENTS

WO 2010046770 A1 4/2010
WO 2015130368 A2 9/2015
WO 2015179618 A1 11/2015

* cited by examiner

COMPOSITES WITH INTERLAMINAR TOUGHENING PARTICLES AND METHOD OF MAKING THE SAME

The instant application claims the benefit of prior U.S. Provisional Application No. 62/583,212 filed on Nov. 8, 2017, the content of which is incorporated herein by reference in its entirety.

DETAILED DESCRIPTION

Figure 1:
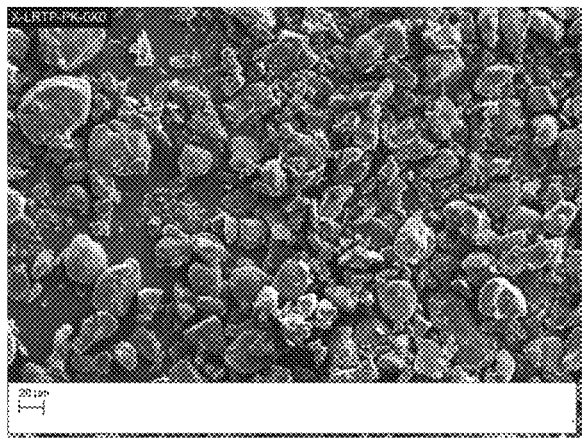
FIG. 1 shows a scanning electron microscope (SEM) image of ground thermoset particles prepared according one example.

Fiber-reinforced polymer (FRP) composites have been used as high-strength, low-weight engineering materials to replace metals in aerospace structures such as primary structures of aircrafts. Important properties of such composite materials are high strength, stiffness and reduced weight.

Multiple layers of prepreg plies are commonly used to form structural composite parts that have a laminated structure. Delamination of such composite parts is an important failure mode. Delamination occurs when two layers de-bond from each other. Important design limiting factors include both the energy needed to initiate a delamination and the energy needed to propagate it.

A cured composite (e.g. prepreg layup) with improved resistance to delamination is one with improved Compression Strength After Impact (CAI) and fracture toughness ($G_{IC}$ and $G_{IIC}$).

CAI measures the ability of a composite material to tolerate damage. In the test to measure CAI, the composite material is subject to an impact of a given energy and then loaded in compression. Damage area and dent depth are measured following the impact and prior to the compression test. During this test, the composite material is constrained to ensure that no buckling instability is taking place and the strength of the composite material is recorded.

Fracture toughness is a property which describes the ability of a material containing a crack to resist fracture, and is one of the most important properties of a material for aerospace applications. Fracture toughness is a quantitative way of expressing a material's resistance to brittle fracture when a crack is present.

Fracture toughness may be quantified as strain energy release rate ($G_c$), which is the energy dissipated during fracture per unit of newly created fracture surface area. $G_c$, includes $G_{IC}$ (Mode I—opening mode) or $G_{IIC}$ (Mode II—in plane shear). The subscript "IC" denotes Mode I crack opening, which is formed under a normal tensile stress perpendicular to the crack, and the subscript "IIC" denotes Mode II crack produced by a shear stress acting parallel to the plane of the crack and perpendicular to the crack front. The initiation and growth of a delamination is often determined by examining Mode I and Mode II fracture toughness.

CAI performance of fiber-reinforced polymer composites may be improved through two main technologies. The first technology involves the use of high-strength reinforcing fibers that have relatively high strain to failure. These fibers appear to absorb a high amount of energy without fracturing thereby redistributing the energy over a larger area of the composite laminate.

CAI performance of fiber-reinforced polymer composites as well as interlaminar toughness ($G_{IC}$ and $G_{IIC}$) may be improved by incorporating certain toughening particles into the interlaminar regions of a multilayer composite laminate. The "interlaminar region" refers to the region between two adjacent structural layers of reinforcement fibers in the composite laminate. The presence of toughening particles in the composite laminate creates a resin rich interlayer which helps to contain the crack propagation in this interlayer region.

Conventionally, thermoplastic particles such as polyamide (PA) have been incorporated into the interlaminar regions of composite laminates to improve CAI. The "interlaminar region" refers to the region between adjacent layers of reinforcing fibres in a multi-layered composite laminate. However, polyamide-based thermoplastic particles can either suffer from low melting points (Tm) especially those polyamides with long aliphatic chains, or be prohibitively hygroscopic such as those polyamides with short aliphatic chains. Amorphous thermoplastic particles such as amorphous PA or PI can suffer from poor solvent resistance. Another issue commonly encountered is the creation of a poor interface between the thermoplastic particles and the thermoset matrix in which the particles are embedded due to the mis-match in coefficient of thermal expansion (CTE) between the particles and the surrounding resin matrix. Such miss-match in CTE can lead to de-bonding during a thermal cycling test. This is commonly referred to as micro-cracking and is a major concern in the aerospace industry.

The present disclosure pertains to the use of chemically active or "live" thermoset particles as interlaminar toughening particles for increasing the damage tolerance and fracture toughness of fiber-reinforced polymer composites. More specifically, the particles contain chemical functional groups which can react with the thermosettable resin matrix in which they are dispersed to form covalent bonds during curing of the resin matrix.

In one embodiment, the chemically active particles are derived from partially curing a thermosettable resin composition past its gel point so as to achieve "solid-like" properties, followed by grinding to obtain the particle size desired. Due to partial curing, there are unreacted or non-crosslinked functional groups on the particle surface. The particles are sufficiently crosslinked past the gel point of the resin composition to maintain the particle integrity upon curing of the composite laminate in which the particles are embedded and to ensure the formation of a distinct interlaminar region.

In another embodiment, the thermosettable resin composition is formulated such that the ratio of thermoset resin(s) and curing agent(s) in the curable resin composition is adjusted so that the composition contains a non-stoichiometric ratio of thermoset resin(s) and curing agent(s), i.e. a deficiency or an excess in the amount of curing agent(s) that is necessary for reacting with 100% of the thermoset resin(s), and consequently, due to this deficiency or excess, there will be unreacted or non-crosslinked functional groups from thermoset resin or curing agent at the end of a full curing cycle. After full curing, the cured resin is then ground to obtain particles with chemically active functional groups on the particle surface. In this embodiment, the resulting chemically active thermoset particle is composed of crosslinked thermoset resin or thermoset polymer and chemically-active functional groups capable of forming covalent bonds. When the particles are formed from a thermosettable resin composition containing epoxy resin(s), the resulting chemically active thermoset particle is composed of cross-linked polyepoxides and non-crosslinked functional groups.

The partially cured particles may be formed from the same or substantially the same curable resin composition that is used to form the matrix resin of the fiber-reinforced composite material, e.g. prepreg. The term "substantially the same" means more than 50% of the composition is the same. In one embodiment, some of the matrix resin to be used for forming the composite material may be set aside for partial curing and grinding to form the chemically active particles. The partially cured particles are then incorporated into the composite laminate at the interlaminar regions. In this way, the CTE of the particles would be an exact match to that of the surrounding resin matrix, thus eliminating stresses and micro-cracking in the cured composite laminates. Furthermore, since the particles are made of the same or similar material as the matrix resin, interfacial bonding between the particles and the surrounding matrix resin after curing is strong.

It has been found that little or no miss-match in CTE occurs between the "live" (chemically active) thermoset particles and the surrounding resin matrix, and as a result, the cured composite laminate displays improved resistance to de-bonding and micro-cracking. The use of "live" thermoset particles as disclosed herein is a departure from the conventional methods used in the aerospace industry, in which thermoplastic or crosslinked thermoplastic toughening particles with dissimilar chemistries from the surrounding matrix resin are used as interlaminar toughening particles.

The "live" thermoset particles disclosed herein are not swellable during curing as in the case of the crosslinked thermoplastic particles disclosed in U.S. Pat. Nos. 8,846,818 and 9,567,426. The swellable crosslinked thermoplastic particles disclosed in the patents are crosslinked, are derived from a composition composed mostly of thermoplastic polymers, and do not typically have reactive functional groups remaining on the particles' surfaces. As such, the swellable particles are not very reactive with the surrounding epoxy-based matrix of the composite in which the particles are dispersed.

Chemically Active Thermoset Particles

The terms "cure" and "curing" as used herein encompass cross-linking of resin precursors or polymers brought about by mixing of based components, heating at elevated temperatures, exposure to ultraviolet light and radiation. "Fully cured" as used herein refers to 100% degree of cure. "Partially cured" as used herein refers to less than 100% degree of cure.

The partially cured particles are formed from a curable resin composition, which has been cured to a degree of cure of less than 100%, for example, within the range of 50%-99% of full cure, including 55%-95%, 50%-86%, 50%-87%, 50%-88%, 50%-89%, 55%-86%, 60%-86%. The curable resin composition contains one or more thermoset resins, at least one curing agent, and optional additives such as thermoplastic polymers, elastomeric materials, conductive particulates, inorganic fillers, etc. At the degree of cure of 50% or higher, the material's thermomechanical properties are significantly altered and the material possesses "solid-like" properties.

To form the partially cured particles, thermal curing is carried out past the gel point of the resin composition. Such gel point may be defined as the crossover point between the G' and G" curves derived from rheology analysis during a cure cycle. G' represents the elastic modulus, and G" represents the viscous modulus.

The degree of cure of a thermoset resin system can be determined by Differential Scanning Calorimetry (DSC). A thermoset resin system undergoes an irreversible chemical reaction during curing. As the components in the resin system cure, heat is evolved by the resin, which is monitored by the DSC instrument. The heat of cure may be used to determine the percent cure of the resin material. As an example, the following simple calculation can provide this information:

% Cure=$[\Delta H_{uncured}-\Delta H_{cured}]/[\Delta H_{uncured}]\times 100\%$

As an example, when the particles are formed from a thermosettable resin composition containing epoxy resin(s) and an amine compound as curing agent, the resulting chemically active thermoset particle is composed of cross-linked polyepoxides, non-crosslinked epoxy functional groups and unreacted amine groups.

In the alternative embodiment, the ratio of thermoset resin(s) and curing agent(s) in the curable resin composition is adjusted so that the composition contains either a deficiency or an excess in the amount of curing agent(s) that is necessary for reacting with 100% of the thermoset resin(s), and consequently, due to this deficiency or excess, there will be unreacted or non-crosslinked functional groups from thermoset resin material at the end of a pre-determined curing cycle. For example, if an X amount of a curing agent is needed to achieve 100% degree of cure in a predetermined curing cycle, less than X amount may be used in the resin composition to achieve chemically active particles, e.g., up to 90% X, including 50%-80% X or 60%-70%. Alternatively, if an X amount of a curing agent is needed to achieve 100% degree of cure in a predetermined curing cycle, more than X amount may be used in the resin composition to achieve chemically active particles, e.g., at least 110% X, including 120%-150% X or 130%-140%.

To determine the lowest possible amount of curing agent (i.e., hardener) in a useful range, one can apply the simplified Carothers equation described in Introduction to Polymers, Third Edition, by Robert J. Young, Peter A. Lovell, pp. 46-47 (CRC Press, Jun. 27, 2011). The simplified Carothers equation is a way to predict the amount of conversion (extent of reaction) needed to reach the gel point for a given epoxy or other thermoset resin with functionality, e.g. 2, 3, 4, etc., when reacted with a curing agent with given functionality, e.g. 2, 3, 4, etc. Gel point versus the available functionality for crosslinking is defined as $n=2/2-pf$, where n=the number average degree of polymerization, p=the decimal extent of the reaction where 1 would represent 100% reacted and f=the total number of functional groups undergoing the crosslinking reactions. Typically one defines the gel point as when n=infinity. For a three functional epoxy and a two functional hardener, the total functionality is 5 so n=infinity when p=0.4, or 40% conversion. For a four functional epoxy and a four functional hardener (e.g., a di-primary amine), f=8 and gelation is predicted at 25% conversion, etc.

Upon full curing of the resin composition, the cured material contains unreacted/noncrosslinked functional groups, which is the source of chemically-active functional groups capable of forming covalent bonds. For example, when epoxy resins and amine curing agents are used and there is a deficiency in the amine compounds, the resulting cured particles contain unreacted/noncrosslinked epoxy functional groups. Conversely, when there is an excess in the amine compounds, the resulting cured particles contain unreacted amine groups.

As an example, when the particles are formed from a thermosettable resin composition containing epoxy resin(s) and an amine compound as curing agent and there is a deficiency in the amine compounds, the resulting chemically active thermoset particle is composed of crosslinked polyepoxides and non-crosslinked epoxy functional groups due to the excess amount of epoxy resin(s).

The chemically active particles may have a mean particle size (d50) of less than about 100 μm, for example, 10-70 μm, 15-50 μm, or 15-30 μm, or 20-25 μm. The mean particle sizes as disclosed herein can be measured by a laser diffraction technique, for example, using Malvern Mastersizer 2000 which operates in the 0.002 nanometer −2000 micron range. "d50" represents the median of the particle size distribution, or alternatively is the value on the distribution such that 50% of the particles have a particle size of this value or less.

Suitable thermoset resins for forming the particles include, but are not limited to, epoxies, phenolics, phenols, cyanate esters, bismaleimides, benzoxazines, polybenzoxazines, polybenzoxazones, combinations thereof and precursors thereof.

Particularly suitable are multifunctional epoxy resins (or polyepoxides) having a plurality of epoxide functional groups per molecule. The polyepoxides may be saturated, unsaturated, cyclic, or acyclic, aliphatic, aromatic, or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)methane), fluorine 4,4'-dihydroxy benzophenone, bisphenol Z (4,4'-cyclohexylidenebisphenol) and 1,5-hyroxynaphthalene. Other suitable polyphenols as the basis for the polyglycidyl ethers are the known condensation products of phenol and formaldehyde or acetaldehyde of the novolac resin-type.

Examples of suitable epoxy resins include diglycidyl ethers of bisphenol A or bisphenol F, e.g. EPON™ 828 (liquid epoxy resin), D.E.R. 331, D.E.R. 661 (solid epoxy resins) available from Dow Chemical Co.; triglycidyl ethers of aminophenol, e.g. ARALDITE® MY 0510, MY 0500, MY 0600, MY 0610 from Huntsman Corp. Additional examples include phenol-based novolac epoxy resins, commercially available as DEN 428, DEN 431, DEN 438, DEN 439, and DEN 485 from Dow Chemical Co; cresol-based novolac epoxy resins commercially available as ECN 1235, ECN 1273, and ECN 1299 from Ciba-Geigy Corp.; hydrocarbon novolac epoxy resins commercially available as TACTIX® 71756, TACTIX®556, and TACTIX®756 from Huntsman Corp.

The curing agents for the curable resin composition may be selected from known curing agents, for example, aromatic or aliphatic amines, or guanidine derivatives. An aromatic amine curing agent is preferred, preferably an aromatic amine having at least two amino groups per molecule, and particularly preferable are diaminodiphenyl sulphones, for instance where the amino groups are in the meta- or in the para-positions with respect to the sulphone group. Particular examples are 3,3'- and 4,4'-diaminodiphenylsulphone (DDS); methylenedianiline; bis(4-amino-3,5-dimethylphenyl)-1,4-diisopropylbenzene; bis(4-aminophenyl)-1,4-diisopropylbenzene; 4,4'methylenebis-(2,6-diethyl)-aniline (MDEA from Lonza); 4,4'methylenebis-(3-chloro, 2,6-diethyl)-aniline (MCDEA from Lonza); 4,4'methylenebis-(2,6-diisopropyl)-aniline (M-DIPA from Lonza); 3,5-diethyl toluene-2,4/2,6-diamine (D-ETDA 80 from Lonza); 4,4'methylenebis-(2-isopropyl-6-methyl)-aniline (M-MIPA from Lonza); 4-chlorophenyl-N,N-dimethylurea (e.g. Monuron); 3,4-dichlorophenyl-N,N-dimethylurea (e.g. Diuron™) and dicyanodiamide (e.g. Amicure™ CG 1200 from Pacific Anchor Chemical).

Suitable curing agents also include anhydrides, particularly polycarboxylic anhydrides, such as nadic anhydride, methylnadic anhydride, phthalic anhydride, tetrahydrophthalic anhydride, hexahydrophthalic anhydride, methyltetrahydrophthalic anhydride, endomethylenetetrahydrophtalic anhydride, and trimellitic anhydride.

For forming partially cured particles, the curing agent(s) may be present at a stoichiometry such that there is sufficient amount of reactive groups from the curing agent to react with the reactive groups of the thermoset resin(s), for example, one (1) mole of amine curing agent per mole of epoxy resin. For forming fully cured but chemically reactive particles, the stoichiometry is such that there is insufficient amount of reactive groups from the curing agent to react with the reactive groups of the thermoset resin(s), for example, 0.5 to 0.9 mole of amine curing agent per mole of the epoxy resin. Alternatively, for forming fully cured but chemically reactive particles, the stoichiometry is such that there is an excess amount of reactive groups from the curing agent to react with the reactive groups of the thermoset resin(s), for example, 1.1 to 1.5 mole of amine curing agent per mole of the epoxy resin.

The optional additives that may be incorporated into the curable resin composition include thermoplastic polymers, elastomers, and combination thereof. Thermoplastic polymers may be selected from: polyamides; polyetherimides (PEI); polysulphones, including polyethersulfones (PES), polyetherethersulfones (PEES); polyphenylene oxide (PPO); poly(ethylene oxide) (PEO), phenoxy (a thermoplastic copolymer of bisphenol A and epichlorohydrin), polyimides (PI), polyamide imides (PAI), Polysulfones (Psu) . . . copolymers and combinations thereof. Elastomers may be selected from: rubbers such as amine-terminated butadiene acrylonitrile (ATBN), carboxyl-terminated butadiene acrylonitrile (CTBN), carboxyl-terminated butadiene (CTB); fluorocarbon elastomers, styrene-butadiene polymers. When present, the amount of thermoplastic polymer and/or elastomer is less than 40% by weight so the particle retains its thermoset characteristics, for example, 5%-35% % of thermoplastic polymer, based on the total weight of the resin composition.

Conductive materials in particulate form, e.g. particles or flakes, may also be added to the curable resin composition to impart through thickness electrical conductivity, also known as Z-conductivity, to the final composite laminate. Examples of suitable conductive materials include metals in the form of flakes or particles such as silver, gold, nickel, copper, aluminum, and alloys thereof, carbon powder, carbon-based nano-sized materials, such as carbon nano-tubes (single-wall nano tubes or multi-wall nano tubes), carbon nano-fibers. The term "nano-sized materials" as used herein, refers to materials having at least one dimension smaller than about 0.1 micrometer (<100 nanometers). Carbon nano-tubes (CNT) are tubular, strand-like structures having external diameters in the range of about 0.4 nm to about 100 nm, for example, the external diameter may be less than about 50 nm or less than about 25 nm, and an aspect ratio from 100:1 up to 5000:1. The nano-fibers may have diameters ranging from 70 nm to 200 nm and a length in the range of 50-200 microns. When present, the amount of conductive materials is less than 10% by weight, for example, 1% -4%, based on the total weight of the resin composition.

Flame retardant additives may also be added to the curable resin composition to impart increased flame retardancy to the final composite laminate. For example, the Strujtol Polydis product range commercialized by Schill+ Seilacher. Other commercially available flame retardant will be obvious to those skilled in the art.

In one embodiment, the particles are formed from a curable resin composition containing: (a) one or more multifunctional epoxy resin(s); (b) at least one amine curing agent; and (c) a thermoplastic or elastomeric toughening agent. The amounts of the components (a)-(c) may be as follows: (a) 100 parts; (b) 5 to 70 parts; (c) 5 to 50 parts.

In another embodiment, the resin composition further includes conductive particles such as carbon nanotubes (CNT), carbon powder, metallic particles, and combinations thereof. When present, the amount of conductive particles is up to 10% by weight based on the total weight of the resin composition, for example, 1%-10%, 2%-5%.

It should be understood by those skilled in the art that, instead of partially curing followed by grinding, the chemically active thermoset particles of the present disclosure may be formed by other processes capable of producing such particles.

Composite Materials and Laminates

The chemically active particles of the present disclosure may be used as interlaminar particles between layers of reinforcement fibers of a composite laminate, i.e., the particles are located in the interlaminar region of the composite laminate. The "interlaminar region" refers to the region between adjacent layers of reinforcing fibres in a multi-layered composite laminate.

In some embodiments, the chemically active particles are dispersed in the interlaminar region formed between adjacent layers of reinforcing fibers at a content of about 2% to about 20% by weight based on the total weight of the matrix resin contained in the composite laminate, including about 5% to about 15%, and about 8% to about 12%.

A composite laminate containing interlaminar particles may be manufactured using different processes. In one embodiment, the particles are deposited onto the surface of a prepreg ply prior to laying up multiple prepreg plies together to form a stack or "prepreg layup". The prepreg plies within the layup may be positioned in a selected orientation with respect to one another, e.g. 0°, ±45°, 90°, etc. When the prepreg plies are stacked together to form a laminate, the particles remain in the interlaminar regions of the laminate. Once in place, the prepreg layup are consolidated and cured under heat and pressure to achieve the required fiber volume fraction with a minimum of voids.

The particles may be deposited onto the prepreg via any conventional techniques such as sprinkling, electrostatic deposition, scatter coating, spray distribution, and any other technique known by a person skilled in the art. The distributed composite particles adhere to the surface of the prepreg due to the tackiness of the matrix resin.

In another embodiment, specific amounts of particles are mixed with a curable resin composition prior to the prepreg manufacturing. In such embodiment, resin films are manufactured first by coating a particle-containing resin mixture onto a release paper. Then, the resulting resin film is laminated onto a layer of fibres, e.g., unidirectional fibers, under the aid of heat and pressure to impregnate the fibres, thereby forming a prepreg ply with specific fibre areal weight and resin content. During the impregnation process, the particles are filtered out and remain external to the fibre layer due to the fact that the size of the particles is larger than the spacing between the fibres. Subsequently, when two layers of prepregs containing particles are laid up one on top of the other, the particles are positioned in the interlaminar regions of the prepreg layup.

In an alternative embodiment, a curable resin composition without particles is coated onto a release paper to form a resin film, which is then brought into contact with one or both opposing surfaces of an un-impregnated fibre layer. The resin impregnates the fibres and leaves a little or no resin on the external surfaces of the fibre layer. Subsequently, a second film of curable resin containing the particles is brought into contact with an outer surface of the resin-impregnated fibre layer. An additional film of curable resin containing the particles may be brought into contact with the opposite outer surface of the resin-impregnated fibre layer to form a sandwich structure. As a result, a particle-rich resin layer remains outside of the impregnated fibre layer and does not further impregnate the fibres. A plurality of such structures are laminated together to form a composite structure with particles in the interlaminar regions.

In another embodiment, two films of curable resin composition without particles are brought into contact with the two opposing surfaces of an un-impregnated fibre layer. The resin impregnates the fibres and leaves little or no resin on the external surfaces of the fibre layer. Subsequently, two films of curable resin containing particles are brought into contact with the opposing surfaces of the pre-impregnated fibres layer. A plurality of such structures are laminated together to form a composite structure with particles in the interlaminar regions. Such approach is preferred as it tends to provide a well-ordered laminate resulted from the particles not disrupting the placement of the fibres.

In the embodiments disclosed herein, the term "prepreg" as refers to a layer of fibrous material (in the form unidirectional fibers, nonwoven mat, or fabric ply) that has been impregnated or infused with a curable matrix resin. The term "impregnate" as used in this disclosure refers to the introduction of a curable resin to reinforcement fibers so as to partially or fully encapsulate the fibers with the matrix resin.

The matrix resin of the prepreg may have the same composition as or is similar in composition to that of the chemically active particles. As such, the thermoset resins, curing agents and additives disclosed previously in reference to the particles also apply to the prepreg's matrix resin.

The fiber reinforcement material may be in the form of a woven or nonwoven fabric ply, or unidirectional tape composed of unidirectional fibers. "Unidirectional fibers" refers to a layer of reinforcement fibers, which are aligned in the same direction. The prepreg plies within the layup may be positioned in a selected orientation with respect to one another, e.g. 0°, ±45°, 90°, etc.

The reinforcement fibers in the composite laminates and prepregs may take the form of chopped fibers, continuous fibers, filaments, tows, bundles, sheets, plies, and combinations thereof. Continuous fibers may further adopt any of unidirectional (aligned in one direction), multi-directional (aligned in different directions), non-woven, woven, knitted, stitched, wound, and braided configurations, as well as swirl mat, felt mat, and chopped mat structures. Woven fiber structures may comprise a plurality of woven tows, each tow composed of a plurality of filaments, e.g. thousands of filaments. In further embodiments, the tows may be held in position by cross-tow stitches, weft-insertion knitting stitches, or a small amount of resin binder, such as a thermoplastic resin.

The fiber materials include, but are not limited to, glass (including Electrical or E-glass), carbon, graphite, aramid, polyamide, high-modulus polyethylene (PE), polyester, poly-p-phenylene-benzoxazole (PBO), boron, quartz, basalt, ceramic, and combinations thereof.

For the fabrication of high-strength composite materials, such as those for aerospace and automative applications, it is preferred that the reinforcing fibers have a tensile strength of greater than 3500 MPa ((per ASTM D4018 test method).

EXAMPLE

Example 1

A resin system U ("Resin U") without toughening particles was prepared based on the formulation shown in Table 1.

TABLE 1

| Component | Units | Resin U |
| --- | --- | --- |
| Araldite MY0510 | weight % | 27.6 |
| Araldite PY306 | weight % | 27.6 |
| Aradur 9664-1 | weight % | 27.3 |
| Sumikaexcel 5003P | weight % | 17.5 |

Resin U was prepared by mixing the epoxy precursors Araldite® MY0510 and Araldite® PY306 at a temperature ranging between 60° C. and 90° C. Araldite® MY0510 is a triglycidyl p-aminophenol and Araldite® PY306 is a diglycidyl ether of bisphenol-F, both from Huntsman Advanced Materials Inc. Sumikaexcel 5003P, a polyethersulphone from Sumitomo Chemical, was added to the epoxy mixture and then dissolved at a temperature ranging between 110° C. and 130° C. The aromatic amine curing agent Aradur® 9664-1, 4,4'-diaminodiphenyl sulphone (4,4'-DDS) from Huntsman Advanced Materials Inc., was then added and mixed at a temperature ranging between 60° C. and 90° C.

The resin U so produced was then filmed to a nominal aerial weight of 23.4 gsm (gram per square meter) on a release paper. Intermediate modulus carbon fibres were spread in a conventional prepreg machine to form a fiber web of unidirectional fibers with a nominal aerial weight of 190 gsm. The formed fiber web was then sandwiched between two films of resin U to obtain a prepreg U with a nominal fiber areal weight (FAW) of 190 gsm, and a nominal resin content of 19.8% by weight.

Four resin compositions P.1-P.4, one without particles and three containing different live thermoset toughening particles were prepared based on the formulations shown in Table 2. All amounts are in weight %.

TABLE 2

| Components | Particle Code | Resin P.1 | Resin P.2 | Resin P.3 | Resin P.4 |
| --- | --- | --- | --- | --- | --- |
| Araldite MY0510 | | 27.6 | 21.2 | 21.3 | 21.3 |
| Araldite PY306 | | 27.6 | 21.2 | 21.3 | 21.3 |
| Aradur 9664-1 | | 27.3 | 23.2 | 21.5 | 21.5 |
| Sumikaexcel 5003P | | 17.5 | 13.4 | 13.5 | 13.5 |
| Live Thermost Resin | VP-0X0 | 0 | 21.0 | 0 | 0 |
| Particle (LRTP) | PK-0X0 | 0 | 0 | 21.0 | 0 |
| | NT-0X0 | 0 | 0 | 0 | 21.0 |

Each resin composition in Table 2 was prepared by mixing the epoxy precursors Araldite® MY0510 and Araldite® PY306 at a temperature ranging between 60° C. and 90° C. Sumikaexcel 5003P (polyethersulphone) was added and then dissolved at a temperature ranging between 110° C. and 130° C. Aradur® 9664-1 (4,4'-DDS) and the live thermoset resin particles (LRTP) were then added and mixed at a temperature ranging between 60° C. and 90° C.

Each resin composition P so produced was then filmed to a nominal areal weight of 23.4 gsm onto a release paper. Using a conventional prepreg machine, the prepreg U formed as described above was sandwiched between two resin films formed from the particle-containing resin composition P to obtain a prepreg P having a nominal fibre areal weight (FAVV) of 190 gsm and a total nominal resin content of 33% by weight. The different toughening particles that were used are labelled as VP-0X0, PK-0X0, NT-0X0 in Table 2. These three toughening particles were prepared using the resin formulations shown in Table 3.

TABLE 3

| Components | Resin VP-0X0 | Resin PK-0X0 | Resin NT-0X0 |
| --- | --- | --- | --- |
| Tactix123 | 55 | 70 | 35.1 |
| Araldite PY306 | 0 | 0 | 35.1 |
| VP3619 | 21.15 | 0 | 0 |
| PKHB100 | 0 | 5 | 0 |
| Carbon nanotube | 0 | 0 | 2.2 |
| Aradur 9664-1 | 23.85 | 25 | 27.6 |

The resins VP-0X0, PK-0X0, NT-0X0 were prepared by mixing the epoxy precursors Tactix123 and Araldite® PY306 at a temperature ranging between 60° C. and 90° C. Tactix123 is a diglycidyl ether of bisphenol-A from Huntsman Advanced Materials Inc.

VP-0X0 Resin: VP3619 and Aradur® 9664-1 were then added and mixed at a temperature ranging between 70° C. and 90° C. Struktol VP3619 is nitrile rubber modified epoxy prepolymer based on diglycidyl ether of bisphenol-A from Schill+Seilacher.

PK-0X0 Resin: PKHB100, a polyhydroxyether (i.e., phenoxy resin) from InChem, was added to the epoxy mixture and then dissolved at a temperature ranging between 110° C. and 130° C. The aromatic amine curing agent Aradur 9664-1 (4,4'-DDS) was then added and mixed at a temperature ranging between 60° C. and 90° C.

NT-0X0 Resin: The multi-wall carbon nanotubes were pre-dispersed in a Tactix123/PY306 blend. The aromatic amine curing agent Aradur 9664-1 (4,4'-DDS) was then added and mixed at a temperature ranging between 60° C. and 90° C.

The three different particles (VP-0X0, PK-0X0, NT-0X0) were prepared by partially curing the three resins VP-0X0, PK-0X0, NT-0X0 by heating them at 2° C./min to 180C and cooling them down immediately after reaching 180° C. The resulting partially cured resins were granulated prior to be milled with an ACM classifier mill from Hosokawa. Differential scanning calorimetry (DSC) testing was performed on the initial three resins VP-0X0, PK-0X0, NT-0X0 as well as on the three particles VP-0X0, PK-0X0, NT-0X0 manufactured as described above to determine the percentage conversion of each of these three particles using the equation below:

$$\% \text{ Cure} = [\Delta H_{uncured} - \Delta H_{cured}]/[\Delta H_{uncured}] \times 100\%.$$

The glass transition temperatures ($T_g$) of these three particles were also obtained from these DSC tests. Finally, the particle size distributions of these particles were measured by laser diffraction using a Mastersizer 3000 from Malvern. Results are summarized in Table 4.

TABLE 4

| | Units | Particle VP-0X0 | Particle PK-0X0 | Particle NT-0X0 |
|---|---|---|---|---|
| Delta_H uncured | [J/g] | 304.6 | 345.9 | 424.3 |
| Delta_H cured | [J/g] | 41.6 | 94.0 | 83.5 |
| % conversion | [%] | 86 | 73 | 118.1 |
| Tg particle | [C.] | 61 | 134 | 80 |
| d50 | [micron] | 32.5 | 21.2 | 24.2 |

FIG. 1 is a scanning electron microscope (SEM) image of the ground particle PK-0X0 disclosed in Table 4.

A plurality of prepregs P was laid up to form a composite laminate. The laminate was enclosed in a conventional zero-bleed, sealed vacuum bag and cured in an autoclave for 2 hours at 180° C. under a pressure of 85 psi (586 kPa or kilopascals) while maintaining the vacuum throughout the cure cycle.

The cured panels were then tested for damage resistance testing (CSAI), and microcracking. The results are reported in Table 5.

TABLE 5

| | Resin P.1 | Resin P.2 | Resin P.3 | Resin P.4 |
|---|---|---|---|---|
| CSAI [ksi] | 26 | 38.7 | 39.1 | 34.8 |
| CSAI [MPa] | 179 | 267 | 269.6 | 240 |
| Particle microcracking | Not applicable | 0 | 0 | 0 |

The results presented in Table 5 illustrates the benefit of introducing these live thermoset toughening particles to increase the impact performances by up to 50% without causing any particle micro-cracking issues.

Figure 2:
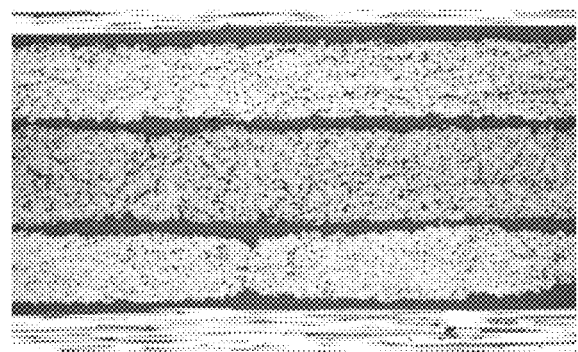
FIG. 2 shows the cross-sectional view of a cured composite laminate, in which distinct interlaminar regions can be seen.

FIG. 2 shows the cross-sectional of the cured composite laminate, in which distinct interlaminar regions can be seen.

Thermal micro-debonding resistance was evaluated by microscopy after 1,200 thermal cycling between −55° C. and 70° C. No micro-cracking was found after this test.

What is claimed is:

1. A fiber-reinforced polymeric composite structure comprising:
    two or more layers of reinforcement fibers impregnated or infused with a curable matrix resin, which comprises one or more thermoset resin(s) and at least one curing agent;
    chemically active thermoset particles positioned in an interlaminar region between adjacent layers of reinforcement fibers,
    wherein each chemically active thermoset particle is formed of a partially cured thermoset polymer with a degree of cure of less than 100%, and each particle comprises, on its surface, chemically-active functional groups capable of forming covalent bonds.

2. The fiber-reinforced polymeric composite structure of claim 1, wherein the degree of cure of the partially cured thermoset polymer is 50%-86%.

3. The fiber-reinforced polymeric composite structure of claim 1, wherein the chemically active thermoset particles are derived from a thermosettable resin composition comprising one or more epoxy resins and at least one amine compound as curing agent.

4. The fiber-reinforced polymeric composite structure of claim 1, wherein each chemically active thermoset particle comprises crosslinked polyepoxides, non-crosslinked epoxy functional groups and unreacted amine groups.

5. The fiber-reinforced polymeric composite structure of claim 1, wherein the composition of the chemically active thermoset particles is the same or substantially the same as that of the curable matrix resin.

6. The fiber-reinforced polymeric composite structure of claim 1, wherein the chemically active thermoset particles further comprises one or more additive selected from:
    conductive materials in particulate form, thermoplastic polymers, elastomers, and flame retardants.

7. A fiber-reinforced polymeric composite structure comprising:
    two or more layers of reinforcement fibers impregnated or infused with a curable matrix resin, which comprises one or more thermoset resin(s) and at least one curing agent;
    chemically active thermoset particles positioned in an interlaminar region between adjacent layers of reinforcement fibers,
    wherein each chemically active thermoset particle comprises crosslinked thermoset polymer and chemically-active functional groups capable of forming covalent bonds.

8. The fiber-reinforced polymeric composite structure of claim 7, wherein each chemically active thermoset particle comprises crosslinked polyepoxides and non-crosslinked epoxy functional groups or unreacted amine groups.

9. The fiber-reinforced polymeric composite structure of claim 7, wherein the chemically active thermoset particles are derived from a thermosettable resin composition comprising one or more epoxy resin(s) and at least one amine compound as curing agent, wherein the molar ratio of epoxy groups to amine groups is such that there is a deficiency or an excess in the amount of amine that is necessary for reacting with 100% of all epoxy groups.

10. A method of making a fiber-reinforced polymeric composite structure, comprising:
    (a) forming thermoset particles with chemically active functional groups on the particles' surfaces;
    (b) forming a plurality of prepreg plies, each prepreg ply comprising reinforcement fibers impregnated or infused with a curable matrix resin;
    (c) depositing the partially cured thermoset particles on at least one surface of each prepreg ply;
    (d) laying up the preprep plies with particles thereon in a stacking arrangement such that there are particles positioned between adjacent prepreg plies, thereby forming a prepreg layup;
    (e) consolidating the prepreg layup; and
    (f) curing the prepreg layup;
    wherein the thermoset particles at (a) are formed by one of the following methods:
    (i) partially curing a thermosettable resin composition comprising one or more thermoset resins and at least one curing agent to form a partially cured thermoset resin with a degree of cure of less than 100%; and grinding the partially cured thermoset resin;
    (ii) forming a thermosettable resin composition comprising one or more thermoset resin(s) and at least one curing agent, wherein the molar ratio of thermoset resin(s) to curing agent is such that there is a deficiency or an excess in the amount of amine that is necessary for reacting with 100% of all epoxy resin(s); curing the thermosettable resin composition to form a crosslinked resin with chemically reactive functional groups; and grinding the crosslinked resin; and wherein, during curing at (f) the chemically active functional groups on the thermoset particles form covalent bonds with the matrix resin surrounding the particles.

11. The method of claim 10, wherein the thermoset particles are produced by method (i) and the degree of cure of the partially cured resin is 50%-86%.

12. The method of claim 10, wherein the thermosettable resin composition for forming the thermoset particles comprises one or more epoxy resins and at least one amine compound as curing agent.

13. A method of making a fiber-reinforced polymeric composite structure, comprising:
  (a) forming thermoset particles with chemically active functional groups on the particles' surfaces;
  (b) forming a curable matrix resin composition comprising one or more thermoset resins, at least one curing agent, and the thermoset particles;
  (c) impregnating plural layers of reinforcement fibers with the curable resin composition to form prepreg plies, each prepreg ply comprising reinforcement fibers impregnated or infused with the curable matrix resin composition and thermoset particles remaining on the outer surfaces of the layer of reinforcement fibers;
  (d) laying up the preprep plies with particles therein in a stacking arrangement, thereby forming a prepreg layup;
  (e) consolidating the prepreg layup; and
  (f) curing the prepreg layup;
  wherein the thermoset particles at (a) are formed by one of the following methods:
  (i) partially curing a thermosettable resin composition comprising one or more thermoset resins and at least one curing agent to form a partially cured thermoset resin with a degree of cure of less than 100%; and grinding the partially cured thermoset resin;
  (ii) forming a thermosettable resin composition comprising one or more thermoset resin(s) and at least one curing agent, wherein the molar ratio of thermoset resin(s) to curing agent is such that there is a deficiency or an excess in the amount of amine that is necessary for reacting with 100% of all epoxy resin(s) groups; curing the thermosettable resin composition to form a cured resin with chemically reactive functional groups; and grinding the cured resin; and
  wherein, during curing at (f) the chemically active functional groups on thermoset particles form covalent bonds with the matrix resin surrounding the particles.

14. The method of claim 13, wherein the thermosettable resin composition for forming the thermoset particles comprises one or more epoxy resins and at least one amine compound as curing agent.

15. A method of making a fiber-reinforced polymeric composite structure, comprising:
  (a) forming thermoset particles with chemically active functional groups on the particles' surfaces;
  (b) forming resin films from a first curable resin composition which does not comprise said thermoset particles;
  (c) forming resin films from a second curable resin composition comprising one or more thermoset resins, at least one curing agent, and said thermoset particles;
  (d) impregnating a layer of reinforcement fibers with at least one resin film formed from the first curable resin composition using heat and pressure, thereby forming a layer of resin-impregnated reinforcement fibers;
  (e) bringing at least one resin film formed from the second curable resin composition into contact with a surface of the layer of resin-impregnated reinforcement fibers, thereby forming a particle-containing prepreg ply;
  (f) forming additional particle-containing prepreg plies according to steps (d) and (e);
  (g) laying up the prepreg plies in a stacking arrangement, thereby forming a prepreg layup;
  (h) consolidating the prepreg layup; and
  (i) curing the prepreg layup;
  wherein the thermoset particles at (a) are formed by one of the following methods:
  (i) partially curing a thermosettable resin composition comprising one or more thermoset resins and at least one curing agent to form a partially cured thermoset resin with a degree of cure of less than 100%; and grinding the partially cured thermoset resin;
  (ii) forming a thermosettable resin composition comprising one or more thermoset resin(s) and at least one curing agent, wherein the molar ratio of thermoset resin(s) to curing agent is such that there is a deficiency or an excess in the amount of amine that is necessary for reacting with 100% of all epoxy resin(s); curing the thermosettable resin composition to form a cured resin with chemically reactive functional groups; and
  grinding the cured resin; and
  wherein, during curing at (i), the chemically active functional groups on thermoset particles form covalent bonds with the matrix resin surrounding the particles.

16. The method of claim 15, wherein the thermosettable resin composition for forming the thermoset particles comprises one or more epoxy resins and at least one amine compound as curing agent.

17. A method of making a fiber-reinforced polymeric composite structure, comprising:
  (a) forming thermoset particles with chemically active functional groups on the particles' surfaces;
  (b) forming a plurality of prepreg plies, each prepreg ply comprising reinforcement fibers impregnated or infused with a curable matrix resin;
  (c) depositing the partially cured thermoset particles on at least one surface of each prepreg ply;
  (d) laying up the preprep plies with particles thereon in a stacking arrangement such that there are particles positioned between adjacent prepreg plies, thereby forming a prepreg layup;
  (e) consolidating the prepreg layup; and
  (f) curing the prepreg layup.

18. The method of claim 17, wherein the thermoset particles at (a) comprise one or more epoxy resins and at least one amine compound as curing agent.

* * * * *